US012583171B2

(12) United States Patent
Stewart et al.

(10) Patent No.: US 12,583,171 B2
(45) Date of Patent: Mar. 24, 2026

(54) THERMOFORMING MACHINE WEB TRANSPORT ASSEMBLY

(71) Applicant: Nelipak Corporation, Whitehall, PA (US)

(72) Inventors: Jason Stewart, Leesport, PA (US); Paul Treible, Lehighton, PA (US)

(73) Assignee: Nelipak Corporation, Whitehall, PA (US)

( * ) Notice: Subject to any disclaimer, the term of this patent is extended or adjusted under 35 U.S.C. 154(b) by 324 days.

(21) Appl. No.: 17/742,385

(22) Filed: May 11, 2022

(65) Prior Publication Data

US 2022/0362986 A1 Nov. 17, 2022

Related U.S. Application Data

(60) Provisional application No. 63/279,368, filed on Nov. 15, 2021, provisional application No. 63/188,757, filed on May 14, 2021.

(51) Int. Cl.
    B29C 51/18 (2006.01)
    B29C 51/26 (2006.01)
    B65H 20/16 (2006.01)
(52) U.S. Cl.
    CPC ............ B29C 51/18 (2013.01); B29C 51/261 (2013.01); B29C 51/262 (2013.01); B65H 20/16 (2013.01)
(58) Field of Classification Search
    CPC ....... B29C 51/18; B29C 51/32; B29C 51/261; B29C 51/262; Y10S 425/048; B65H 20/16
    See application file for complete search history.

(56) References Cited

U.S. PATENT DOCUMENTS

| | | | | | |
|---|---|---|---|---|---|
| 2,557,492 | A | * | 6/1951 | Young | ...................... D06C 3/04 |
| | | | | | 226/10 |
| 3,193,881 | A | * | 7/1965 | Kostur | ................... B29C 51/18 |
| | | | | | 226/173 |

(Continued)

FOREIGN PATENT DOCUMENTS

EP            1602608 A1    12/2005

OTHER PUBLICATIONS

"Film Gripper Chains" by Regina Chain, 6 pages, dated 2018.
(Continued)

*Primary Examiner* — Jerzi H Moreno Hernandez
(74) *Attorney, Agent, or Firm* — Nelson Mullins Riley & Scarborough LLP

(57) ABSTRACT

A web transport assembly for moving flexible sheet material in a manufacturing process. The web transport assembly comprises first and second gripper chains spaced apart from one another to define a path of travel of the flexible sheet material, each of the gripper chains having a plurality of saddle links and a plurality of gripper links. First and second parallel rail structures are respectively aligned with the first and second gripper chains. In addition, upstream and downstream hubs are associated with each of the first and second gripper chains to define a continuous loop about which the associated gripper chain extends. At least one of the hubs includes a driven sprocket having a plurality of teeth engaging the associated gripper chain. The saddle links have a pair of spaced apart extension portions defining a spaced in which an associated one of the rails is received. The gripper links have a gripper mechanism that is configured to clamp a side of the flexible sheet material.

7 Claims, 13 Drawing Sheets

(56) References Cited

U.S. PATENT DOCUMENTS

| 4,475,881 | A | * | 10/1984 | Borst | ...................... | B29C 51/18 |
| | | | | | | 425/384 |
| 4,915,283 | A | * | 4/1990 | Buchko | .................. | B29C 31/00 |
| | | | | | | 226/173 |
| 9,988,169 | B2 | * | 6/2018 | Mochizuki | .............. | B65B 51/10 |
| 10,689,136 | B2 | | 6/2020 | Ehrmann | | |
| 2014/0158502 | A1 | | 6/2014 | Kurz | | |
| 2018/0037352 | A1 | * | 2/2018 | Lauth | ...................... | B29C 51/18 |

OTHER PUBLICATIONS

"Thermoforming Sticker Chains" by Regina Chain, 6 pages, dated 2017.
International Search Report for corresponding PCT Application No. PCT/US2022/028967, 2 pages, dated Aug. 30, 2022.
International Preliminary Report on Patentability and Written Opinion of the International Searching Aurhority for corresponding PCT Application No. PCT/US2022/028967, dated Nov. 14, 2023.

* cited by examiner

THERMOFORMING MACHINE WEB TRANSPORT ASSEMBLY

PRIORITY CLAIM

This application is based upon and claims the benefit of provisional application Ser. No. 63/188,757, filed May 14, 2021, and provisional application Ser. No. 63/279,368, filed Nov. 15, 2021. Both of the aforementioned applications are incorporated fully herein by reference for all purposes.

FIELD OF THE INVENTION

Embodiments of the present invention relate to thermoforming equipment used in packaging applications. More particularly, embodiments of present invention relate to a thermoforming machine having a novel web transport assembly.

BACKGROUND OF THE INVENTION

Thermoforming is a manufacturing process using thermoplastic sheet. In operation, plastic sheet is typically unwound from a roll by a system of rollers and fed into a pin chain transport system at the back end of a thermoforming machine. The steel pin chain punctures through the plastic sheet to pull it forward to the forming station where blisters are formed by a mold and plug. The sheet with formed blisters is then pulled into a trimming station to cut the blisters out of the plastic sheet. Blisters are removed from the web for inspection and final packaging.

While pin chain transport systems have worked reasonably well for their intended purpose, room for improvement exists in the art.

SUMMARY OF THE INVENTION

The present invention recognizes and addresses the foregoing considerations, and others, of prior art constructions and methods.

In this regard, one aspect of the present invention provides a web transport assembly for moving flexible sheet material in a manufacturing process. The web transport assembly comprises first and second gripper chains spaced apart from one another to define a path of travel of the flexible sheet material, each of the gripper chains having a plurality of saddle links and a plurality of gripper links. First and second parallel rail structures are respectively aligned with the first and second gripper chains. In addition, upstream and downstream hubs are associated with each of the first and second gripper chains to define a continuous loop about which the associated gripper chain extends. At least one of the hubs includes a driven sprocket having a plurality of teeth engaging the associated gripper chain. For example, the upstream hub may be an idler and the downstream hub may be driven. The saddle links according to this aspect have a pair of spaced apart extension portions defining a space (gap) in which an associated one of the rails is received. The gripper links have a gripper mechanism that is configured to clamp a side of the flexible sheet material. In some embodiments, a stop device that is actuatable to either allow or prevent movement of the plastic sheet into the gripper chains may be provided.

According to some exemplary embodiments, the first and second gripper chains may comprise only saddle links and gripper links. For example, the gripper links and the saddle links may be alternated in each of the first and second gripper chains such that every two of the gripper links are interconnected with each other by one of the saddle links. The gripper mechanism of each of the gripper links may be spring-loaded to clamp the side of the plastic sheet.

In some exemplary embodiments, at least one of the hubs comprises an angled portion beside a sprocket portion, the angled portion defining an engaging surface which causes opening of the gripper mechanism. For example, both the upstream hub and the downstream hub may comprise an angled portion beside a sprocket portion. The engaging surface may be situated at an angle of about 5 degrees to 18 degrees (e.g., approximately 17 degrees on the upstream (idler) end and approximately 10 degrees on the downstream (driven) end) relative to an axis of rotation of the at least one of the hubs.

Another aspect of the present invention provides a thermoforming machine comprising a heating oven, a forming station, and a trimming station through which plastic sheet material travels in order to produce molded packages. A web transport assembly is operative to move the plastic sheet material through at least the forming station. The web transport assembly includes first and second gripper chains spaced apart from one another, each of the gripper chains having a plurality of saddle links and a plurality of gripper links. First and second parallel rail structures are respectively aligned with the first and second gripper chains. Upstream and downstream hubs associated with each of the first and second gripper chains define a continuous loop about which the associated gripper chain extends. Each of the saddle links in this aspect has a structure that engages an associated one of the rails. In addition, each of the gripper links has a gripper mechanism that is configured to clamp a side of the flexible sheet material.

A still further aspect of the present invention provides a web transport assembly for moving flexible sheet material in a manufacturing process. The web transport assembly comprises first and second gripper chains spaced apart from one another to define a path of travel of the flexible sheet material, each of the gripper chains having a plurality of saddle links and a plurality of gripper links. First and second parallel rail structures respectively aligned with the first and second gripper chains are also provided. Upstream and downstream hubs are associated with each of the first and second gripper chains defining a continuous loop about which the associated gripper chain extends. Each of the saddle links has a structure that engages an associated one of the rails. Each of the gripper links has a gripper mechanism that is configured to clamp a side of the flexible sheet material, the gripper mechanism of each of the gripper links being spring-loaded to clamp the side of the plastic sheet. At least one of the hubs comprises an angled portion beside a sprocket portion, the angled portion defining an engaging surface which causes opening of the gripper mechanism.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

3

Figure 2:
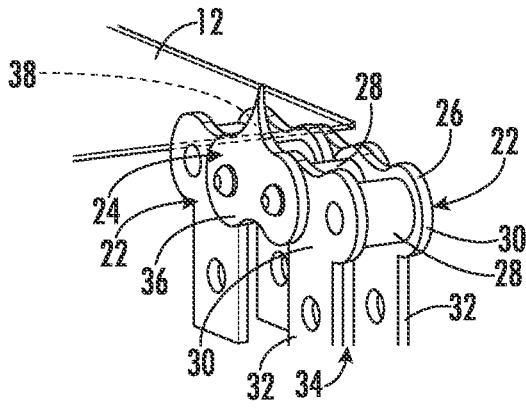

FIG. 2 is a perspective view of a few links of a pin chain transport system of the prior art.

Figure 3:
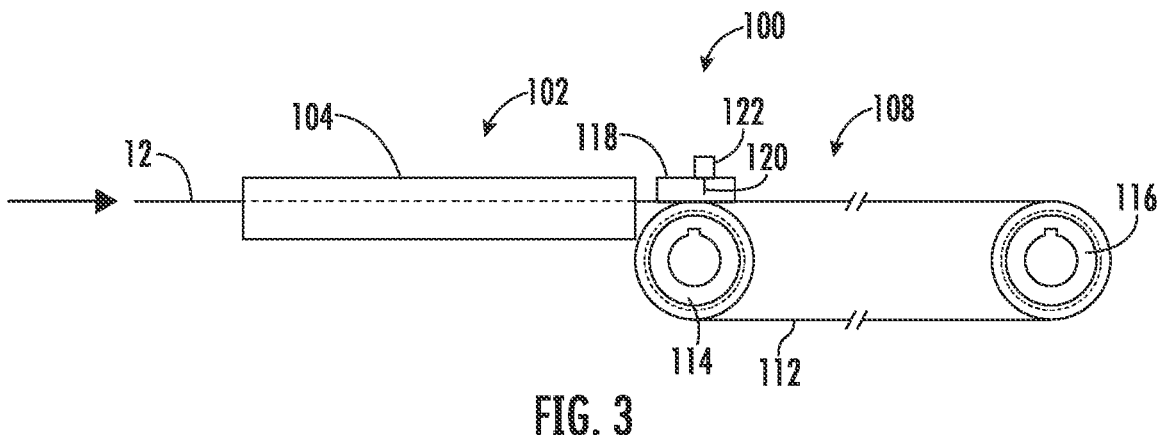

FIG. 3 is a diagrammatic representation of a web transport assembly in accordance with an embodiment of the present invention.

Figure 4:
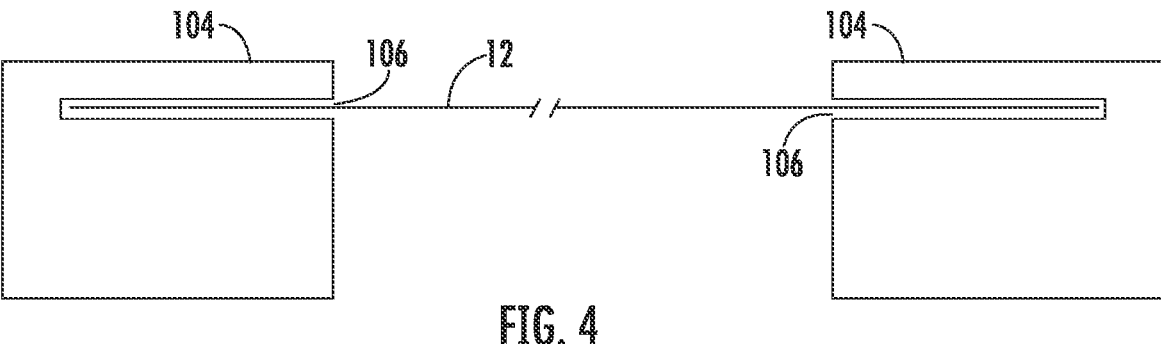

FIG. 4 is a diagrammatic end view of an infeed structure that may be used in a web transport assembly of the present invention.

Figure 5:
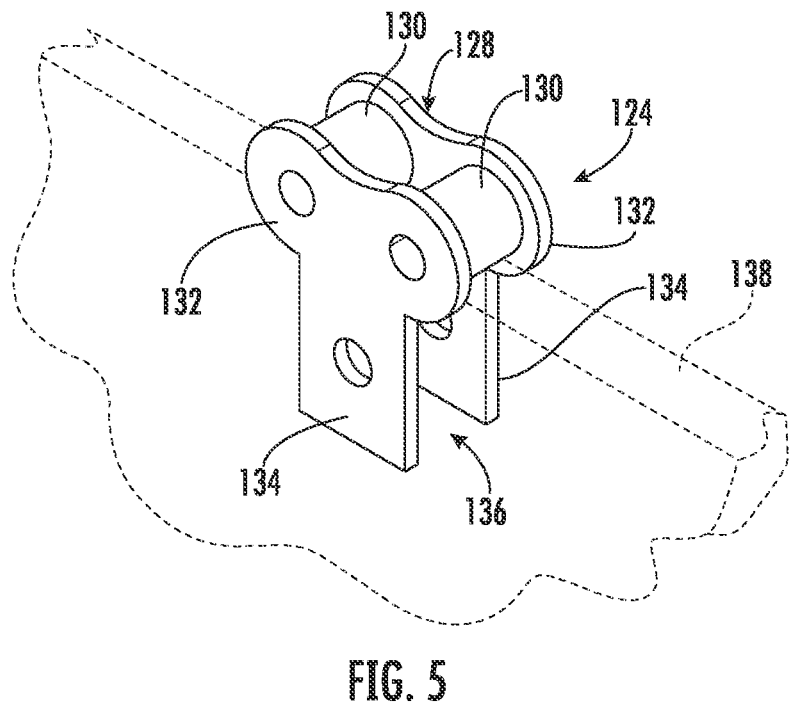

FIG. 5 is a perspective view of a saddle link that may be utilized in a gripper chain in accordance with the present invention.

Figure 6:
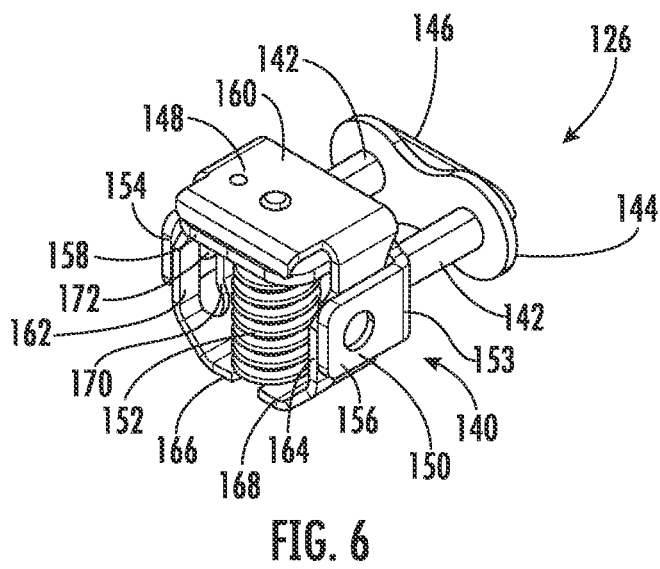

FIG. 6 is a perspective view of a gripper link that may be utilized in a gripper chain in accordance with the present invention.

Figure 7:
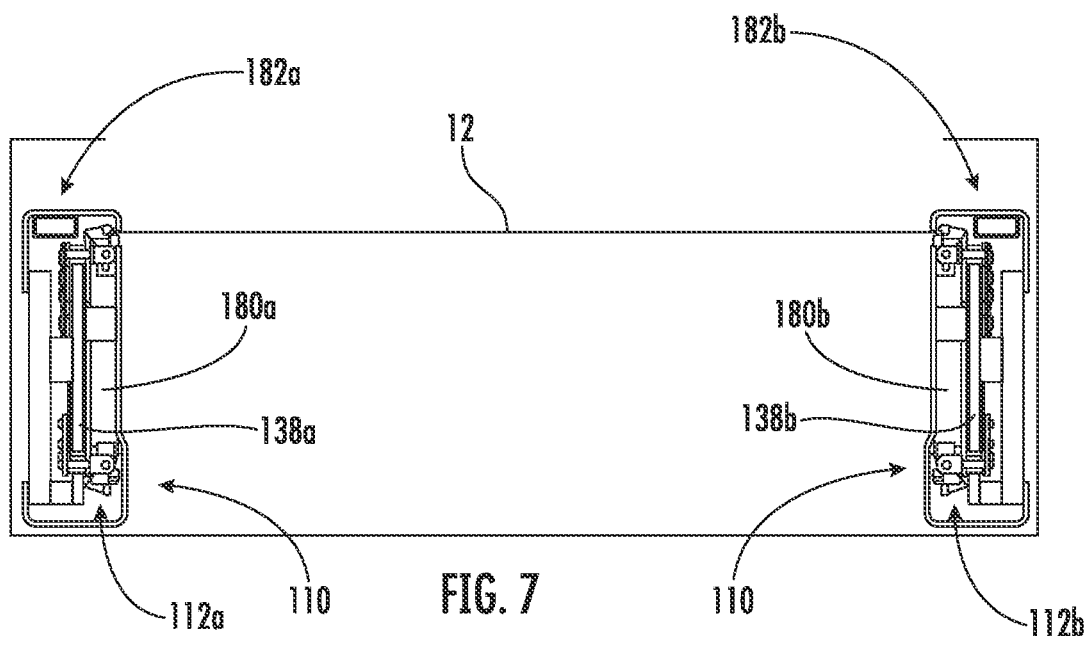

FIG. 7 shows aspects of a web transport assembly in accordance with embodiments of the present invention.

Figure 8:
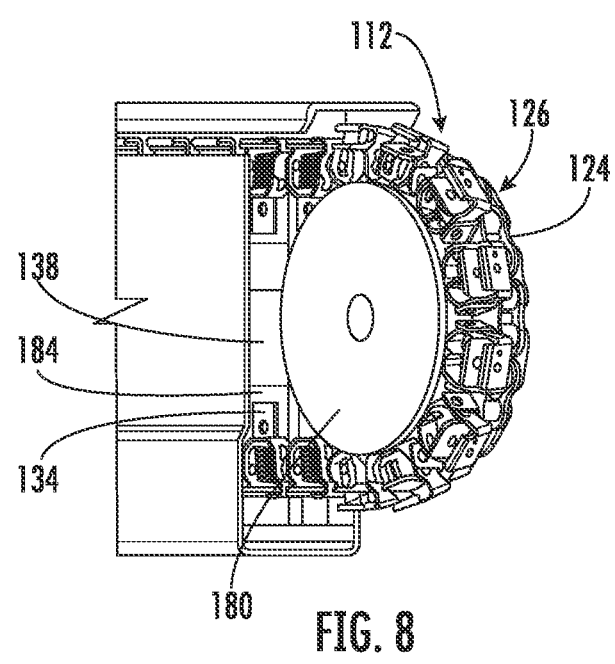

FIG. 8 shows a gripper chain according to an embodiment of the present invention extending around a hub.

Figure 9:
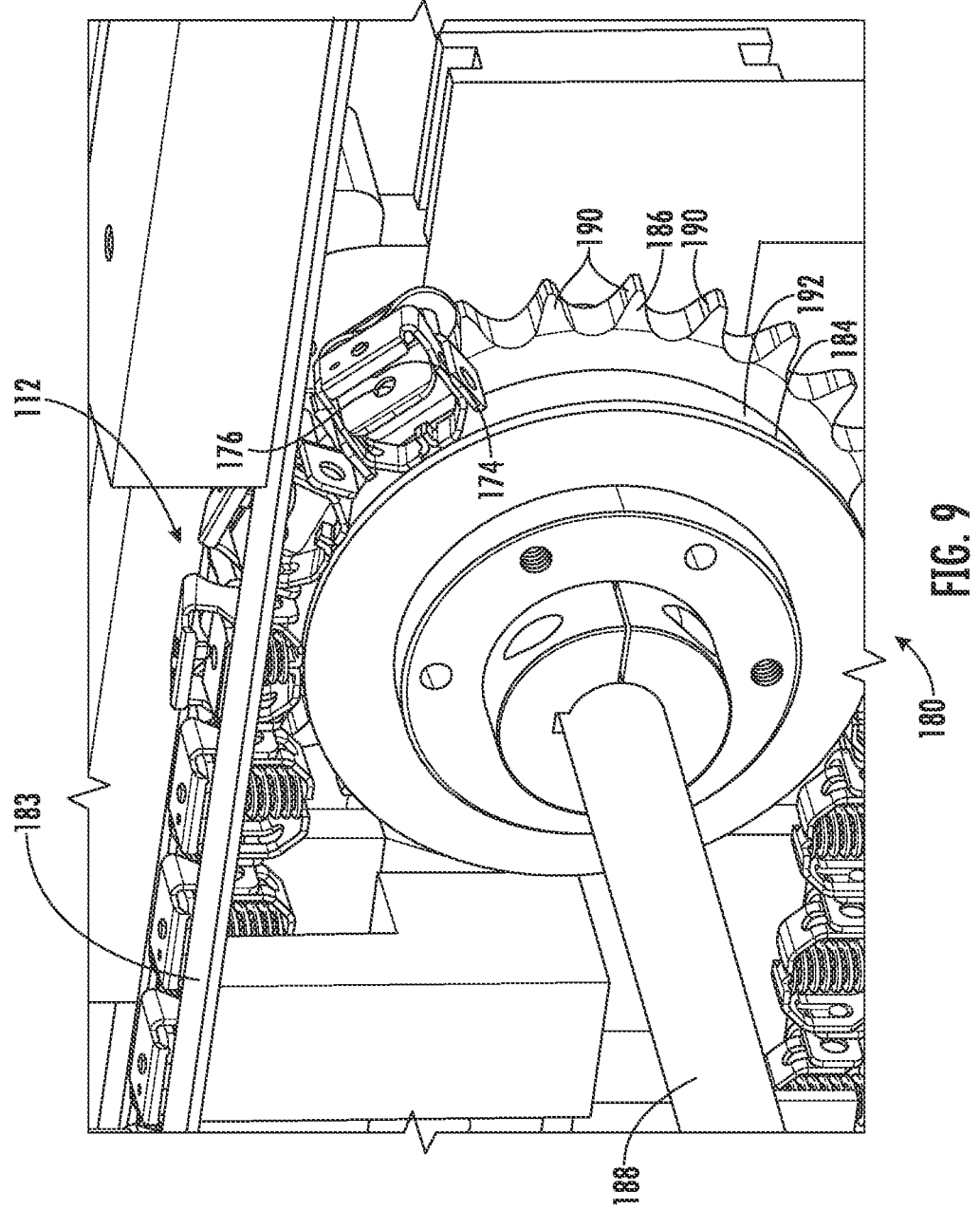

FIG. 9 is an enlarged perspective view showing a gripper chain according to an embodiment of the present invention extending around a hub with some links being removed from the sprocket to reveal additional structure.

Figure 10:
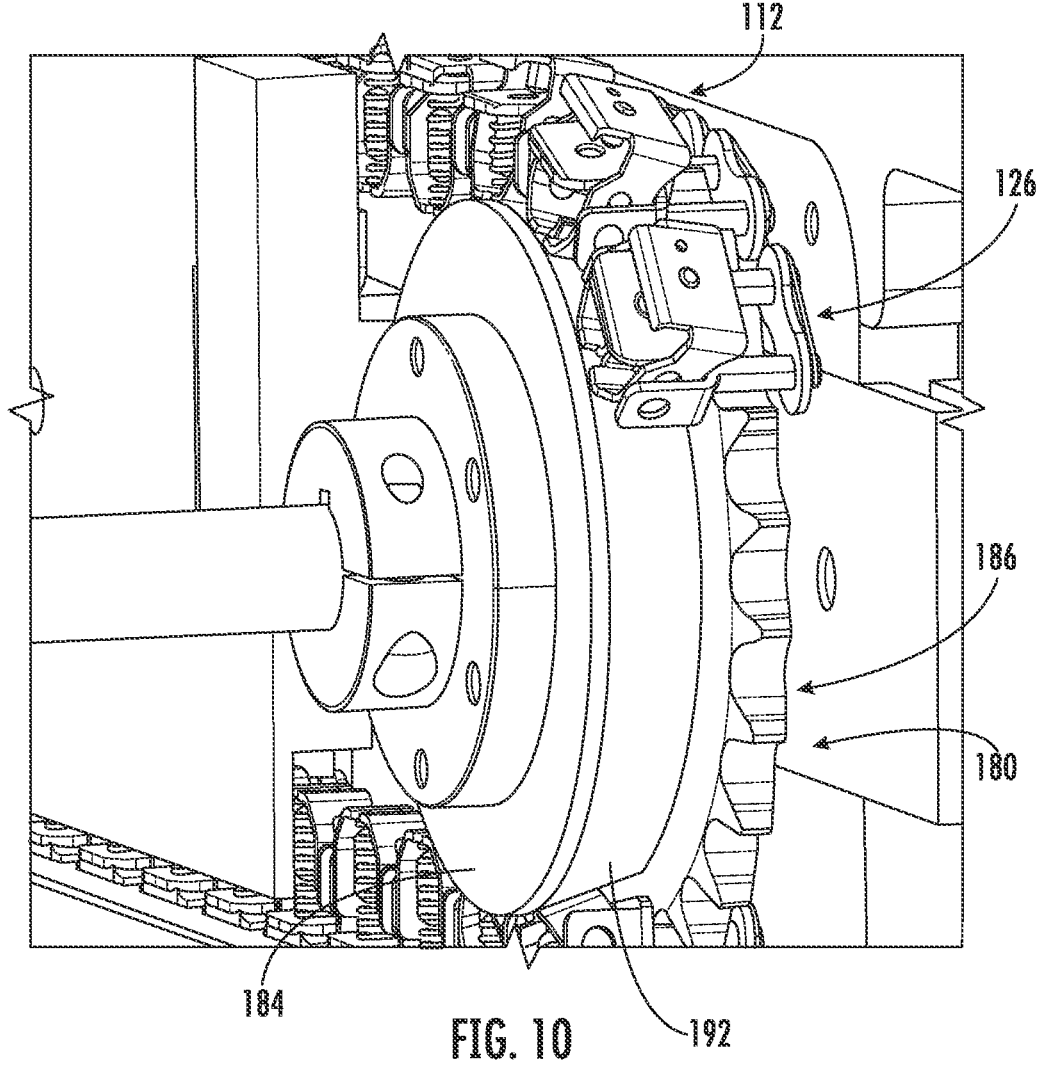

FIG. 10 is an additional view similar to FIG. 9.

Figure 11:
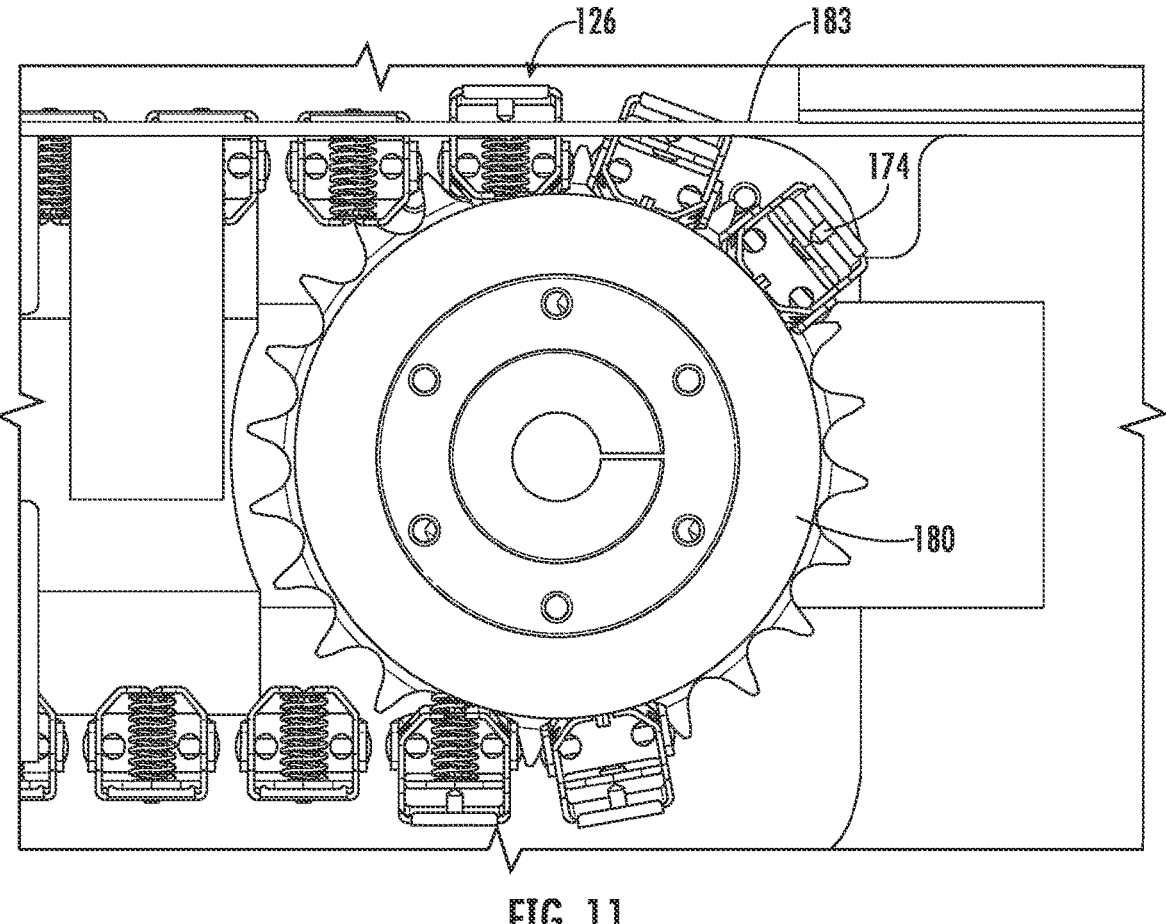

FIG. 11 is an enlarged elevational view showing a gripper chain according to an embodiment of the present invention extending around a hub with some links being removed from the sprocket to reveal additional structure.

Figure 12:
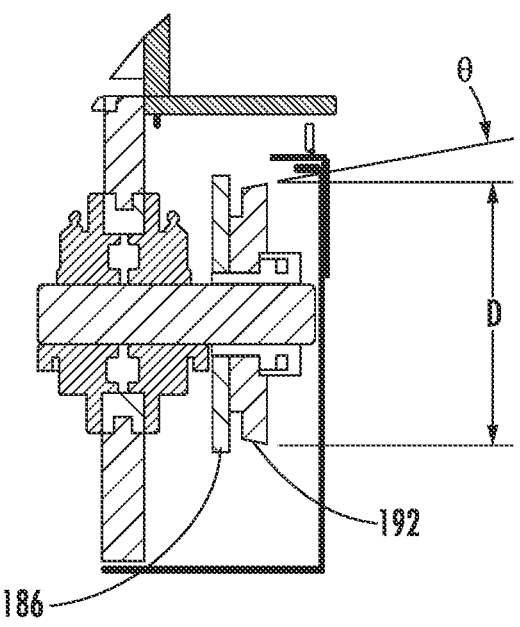

FIG. 12 is a cross-sectional view of a hub.

Figure 13:
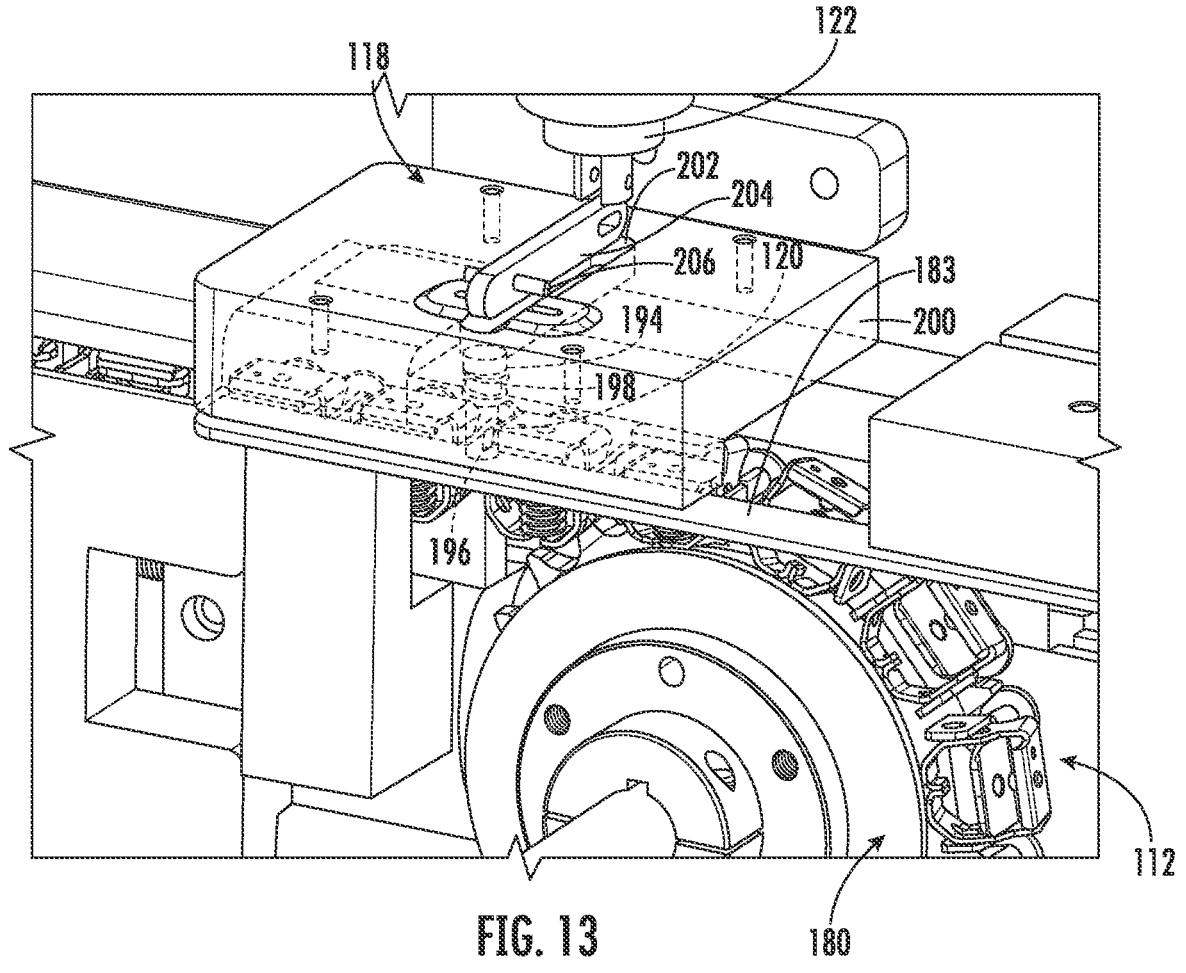

FIG. 13 is an enlarged perspective view showing the gripper chain and hub, with springs being removed from some links and further showing an exemplary material feed stop utilized for initial placement of the plastic sheet.

Figure 14:
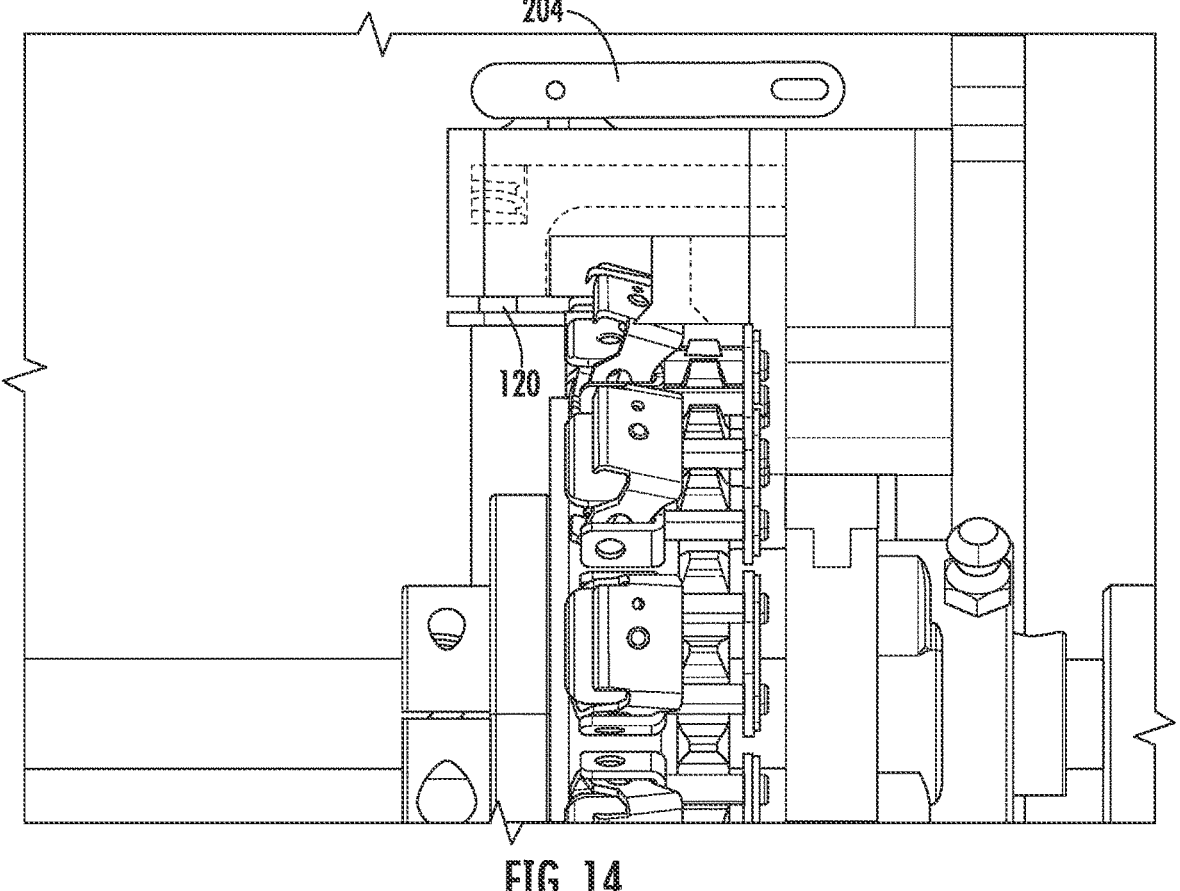

FIG. 14 is an enlarged end view of the hub also showing the material feed stop of FIG. 13.

Figure 15:
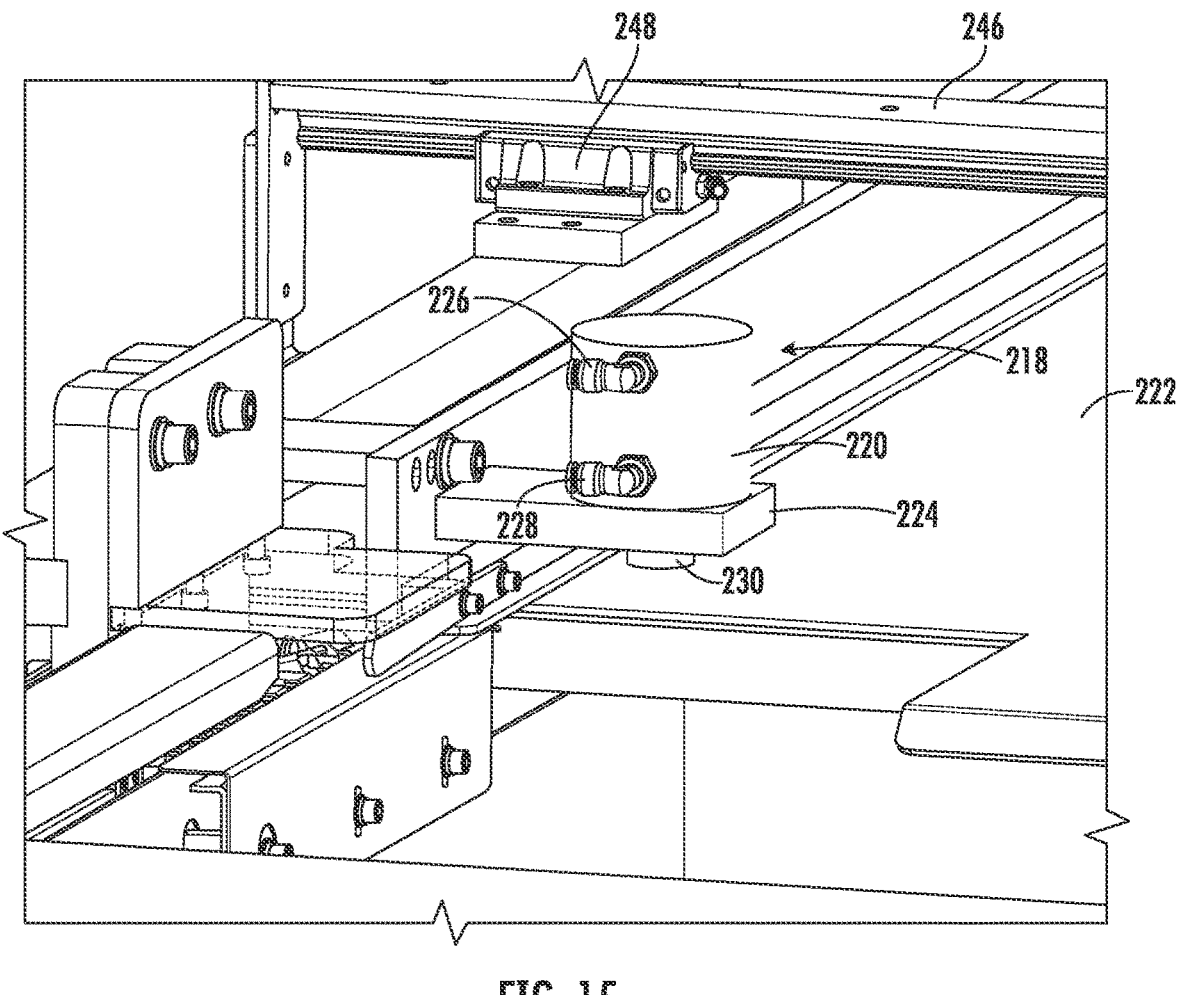

FIG. 15 is an enlarged perspective view showing an exemplary material feed stop in accordance with another embodiment of the present invention.

Figure 16:
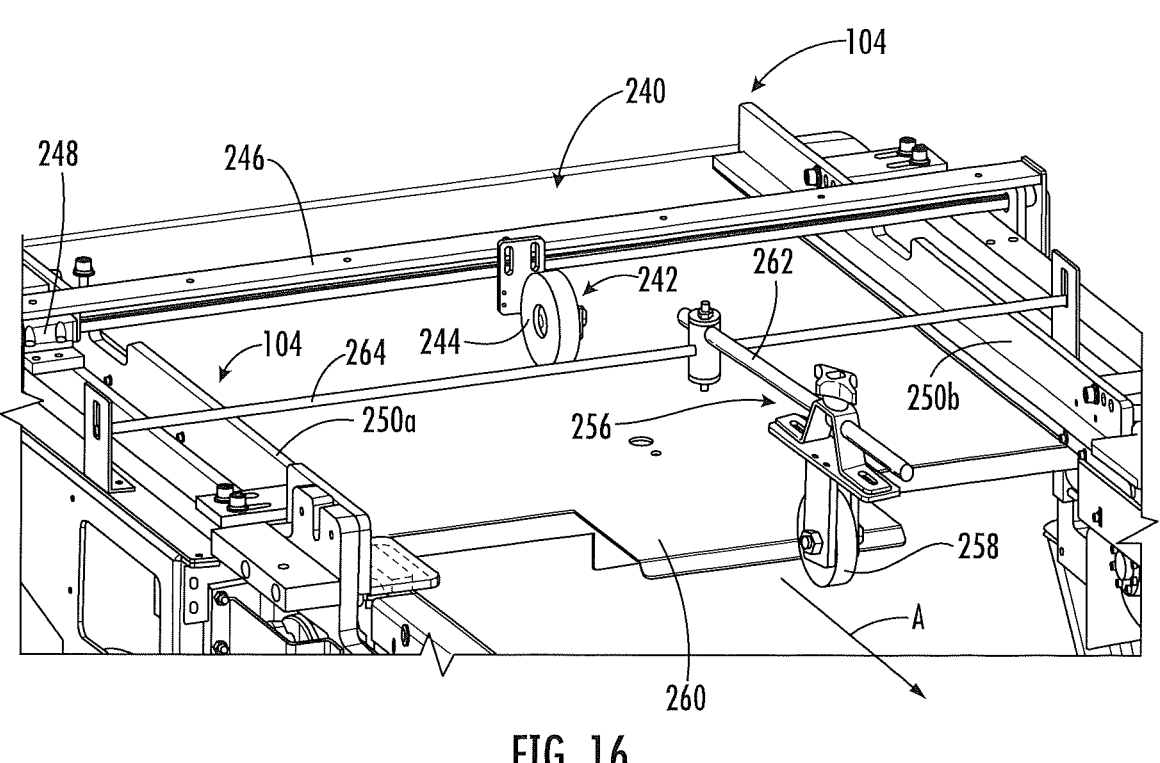

FIG. 16 is a perspective view showing a sheet guide protector assembly which may be installed at the infeed of the thermoforming machine in accordance with an exemplary embodiment.

Figure 17:
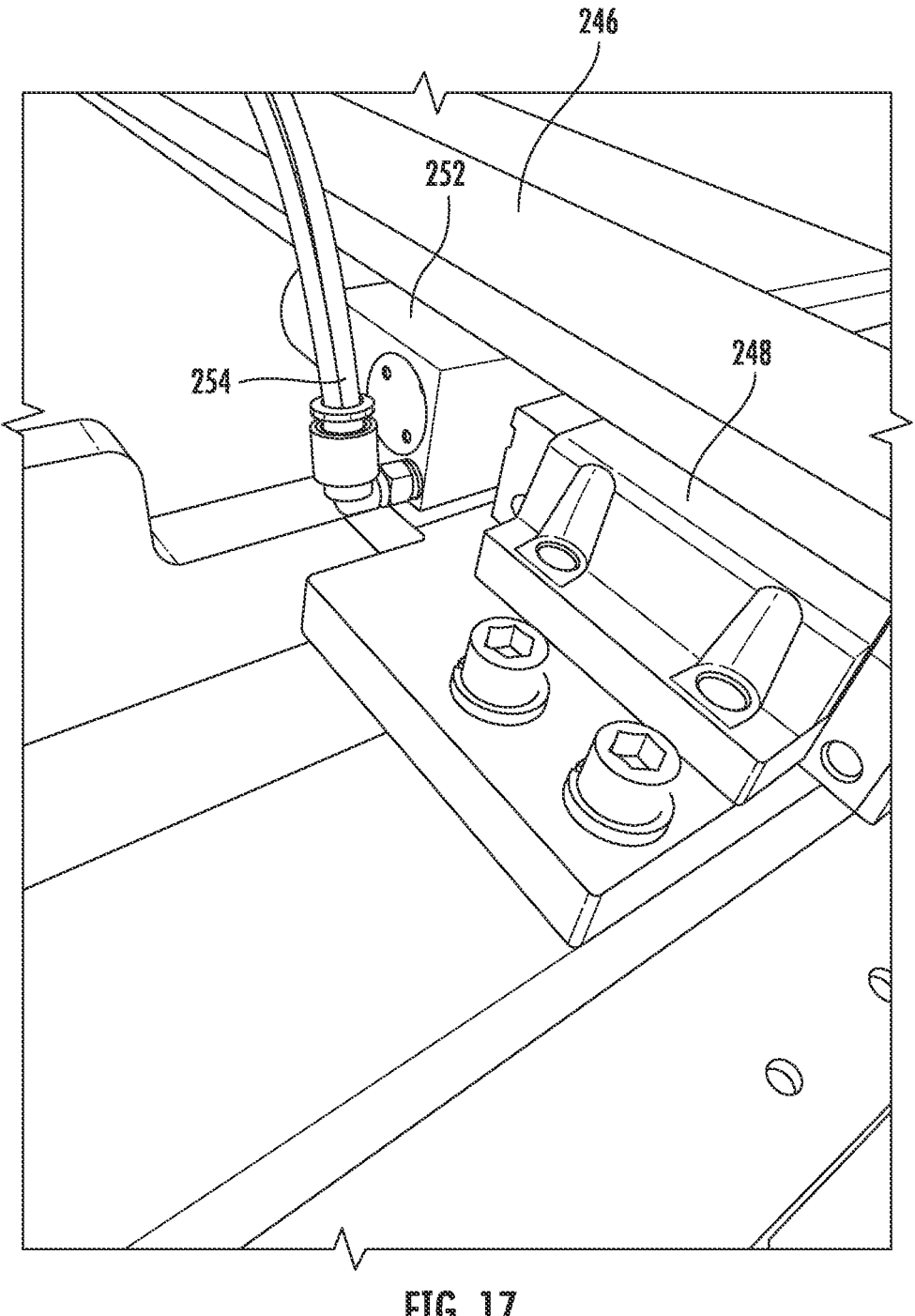

FIG. 17 is an enlarged perspective view showing a brake mechanism for use with an infeed section of the machine.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
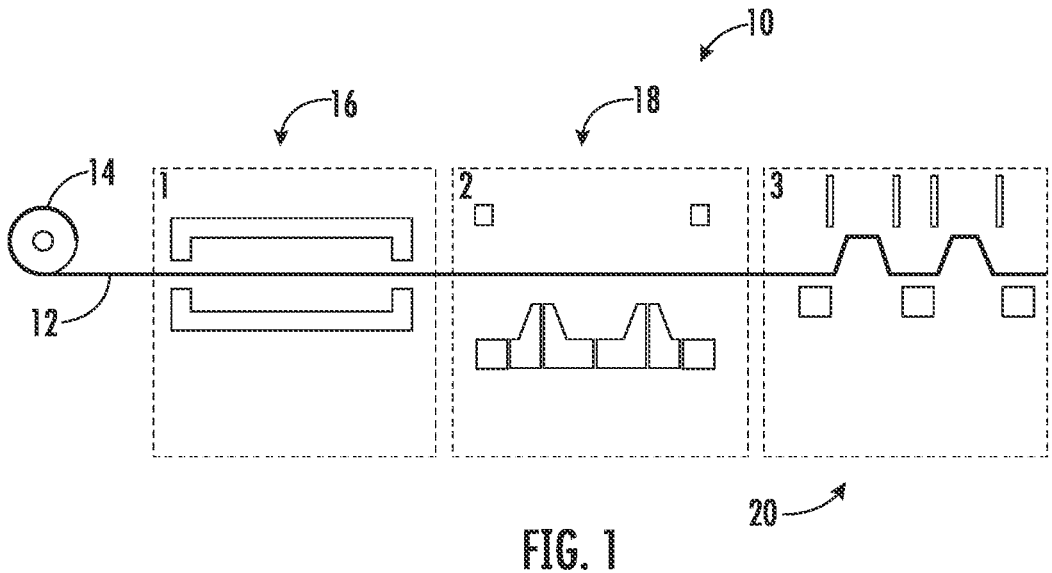
FIG. 1 is a diagrammatic representation showing the various stages of a thermoforming machine with which the novel web transport assembly of the present invention may be utilized.

FIG. 1 diagrammatically illustrates a thermoforming machine 10 that may utilize improvements provided by the present invention. As shown, plastic sheet 12 initially stored on a roll 14 is fed through the thermoforming machine via a gripper chain assembly described in more detail below. The thermoforming machine 10 may be generally thought of as having three stations: (1) a heating oven 16; (2) a forming station 18, and (3) a trimming station 20. The heating oven 16 serves to raise the temperature of the plastic sheet 12 above the temperature threshold at which it becomes sufficiently pliable to mold. The sheet advances to the forming station 18, where blisters are formed by a mold and plug. The sheet with formed blisters is then pulled into the trimming station 20 to cut out the blisters.

As noted above, prior art utilized a pin chain transport system to move the sheet through the thermoforming machine. In this regard, FIG. 2 illustrates several links of a pin chain that would typically be used in a pin chain transport system. As shown, the pin chain has a pair of "saddle links" 22 interconnected by a pin link 24. Each of the saddle links 22 has a main link portion 26 similar to a typical chain link. Each such main link portion 26 has a pair of transverse rollers 28 extending between a pair of side plates 30. Unlike a typical chain link, however, the side plates have a respective extension portion 32 extending inwardly (i.e., towards the inside of the closed travel path of the chain). Together the extension portions 32 define a space 34 between them that receives a fixed rail of the web transport assembly. The rail ensures that the spacing between the chains remains the same as the plastic sheet is advanced.

Pin link 24 extends between and interconnects every other saddle link 22. As shown, the inner side plate 36 of the pin link 24 defines a projection (or "pin") 38 that extends outwardly (i.e., towards the outside of the closed travel path of the chain). The projection 38 pierces the plastic sheet 12 and pulls it along as the chain moves.

FIG. 3 illustrates certain aspects of a web transport assembly 100 in accordance with an embodiment of the present invention. Plastic sheet 12 is fed (e.g., from a roll) into an infeed section 102 having left and right laterally-spaced guides 104. As can be seen most clearly in FIG. 4, guides 104 define opposed horizontal channels 106 in which the side edges of the plastic sheet 12 are located. Notably, embodiments of the present invention utilize an infeed section having several significant improvements over the prior art. First, the overall length of the horizontal channels 106 is increased in length. Second, the height of the horizontal channel 106 is reduced to mitigate motion on the plastic as it indexes. Third, the width of the horizontal channel has been increased to add more stability (reduce any plastic vibrations or unnecessary movement during the process/indexing of the material).

Referring again to FIG. 3, sheet 12 exits guides 104 adjacent a gripper chain section 108. As shown, gripper chain section 108 includes right and left chain assemblies 110 (see FIG. 7) by which the sheet 12 is grasped and moved downstream through the thermoforming machine. Each chain assembly 110 includes a gripper chain 112 in the form of a loop around upstream and downstream hubs 114 and 116. At least one of hubs 114 and 116 will typically comprise a sprocket that is driven in order to turn the chain. For example, hub 116 may be driven with hub 114 functioning as an idler. One skilled in the art will appreciate that corresponding sprockets on both of right and left chain assemblies 110 may be driven by a common shaft in order to ensure that they are synchronized in their rotation. The common shaft may, for example, be directly driven by a motor/gearbox or may be indirectly driven such as by belts, chains, or the like.

In this embodiment, gripper chain section 108 also includes a stop device 118 which functions to stop the end of the plastic sheet 12 adjacent the location where it can be grasped by the gripper chains 112. Stop device 118 is engaged during set-up, as sheet 12 is fed into the gripper chain section 108, to prevent sheet 12 from advancing too far into the gripper chain section 108. This prevents sheet 12 from "riding over" the clamps of the gripper chains 112. When sheet 12 is in the correct location to be grasped, the stop device can be disengaged. Gripper chains 112 then grasp and pull the sheet 12 forward. In this embodiment, stop device 118 includes a mechanical stop 120 that is moved in and out of the engaging position by an actuator 122. Suitable actuators may include a solenoid or a fluid-actuated (i.e., hydraulic or gas such as pneumatic) cylinder. Stop device 118, which is generally optional but may be deemed desirable in some embodiments, is described more fully below.

Referring now to FIGS. 5 and 6, each of the gripper chains 112 in this embodiment comprises a plurality of saddle links 124 and a plurality of gripper links 126 connected together to form an endless chain. For example, saddle links 124 and gripper links 126 may be alternated along the length of the chain. As shown in FIG. 5, each of the saddle links 124 has a main link portion 128 similar to a typical chain link. Each such main link portion 128 has a pair of transverse rollers 130 extending between a pair of side plates 132. Each of the side plates 132 has a respective extension portion 134 extending inwardly (i.e., towards the inside of the closed travel path of the chain). The extension portions 134 define a space (gap) 136 between them that receives a fixed rail 138 of the web transport assembly.

As shown in FIG. 6, the gripper links 126 each include a gripper mechanism 140 that provides one side plate of the chain link. A pair of transverse pins 142 extend from gripper mechanism 140 to a second side plate 144. Side plate 144 may be retained in place using a C-clip 146, as would be understood by one skilled in the art. In the assembled chain, each of the pins 142 would be received in respective rollers of adjacent forward and aft saddle links. Embodiments are contemplated, however, in which there are a greater number of saddle links than gripper links or a greater number of gripper links than saddle links. In other embodiments, typical chain links may also be provided intermittent with saddle links and gripper links.

Gripper mechanism 140 provides a clamp that is selectively opened to receive the side of plastic sheet 12 as it is fed into the thermoforming machine. The clamp is formed by a movable portion 148 that is urged into a closed position relative to a fixed portion 150 via a spring 152. Fixed portion 150 includes a first plate 153 from which pins 142 extend, forward and aft plates 154 and 156, and a top plate 158. Movable portion 148 includes a top plate 160 adjacent to top plate 158 in the closed position. In addition, movable portion 148 has forward and aft plates 162 and 164 located adjacent to and inside of forward and aft plates 154 and 156, respectively. Forward and aft plates 162 and 164 bend downwardly and inwardly to provide respective support ledges 166 and 168. As shown, spring 152 is captured between the upper surfaces of support ledges 166 and 168 and the bottom surface of plate 158.

Forward and aft plates 162 and 164 of the movable portion 148 each define a generally vertical slot (e.g., slot 170) into which a guide element (e.g., guide element 172) integral with the adjacent one of forward and aft plates 154 and 156 extends. In this embodiment, the guide elements are in the form of a small pin that protrudes into the slot. As one skilled in the art will appreciate, pushing support ledges 166 and 168 in a direction that compresses spring 152 will cause top plate 160 to separate from top plate 158. This provides an opening into which the side of plastic sheet 12 can be received. Once the pushing force is released, spring 152 forces top plate 160 back into position near top plate 158. In this manner, the plastic sheet 12 will be securely clamped by the gripper mechanism 140.

As shown in FIG. 9, a projection 174 may depend from top plate 160 for receipt in a corresponding hole 176 defined in top plate 158. The interaction of projection 174 and hole 176 serves to further secure plastic sheet 12. Preferably, projection 174 has a blunt end that will not normally penetrate plastic sheet 12. In addition, the gripper links have enough clamping strength that only a small portion of the plastic sheet side is required for engagement to keep the sheet taut.

FIG. 7 is a cross section of a portion of the thermoforming machine (looking down the axis of process flow) showing the location at which plastic sheet 12 is fed into left and right gripper chains 112a and 112b. As can be seen, gripper chains 112a and 112b loop around respective hubs 180a and 180b that cause the clamps of the gripper mechanisms to open for receipt of plastic sheet 12 (some links of the gripper chain around the hubs are removed for purposes of illustrating structure underneath). The hubs 180a and 180b, as well as respective rails 138a and 138b, are carried by frame structures 182a and 182b. As shown in FIG. 8, rail 138 may have a low friction coating 184, such as a suitable plastic, to lessen friction from the saddle links 124.

Certain aspects regarding hub 180 can be most easily explained with reference to FIGS. 9-11. (Note that some chain links, as well as other details like some springs 152, are omitted in these figures so other details can be more easily seen. Chains 112 are continuous and will extend around the hubs for the return.) The theoretical plane at which plastic sheet 12 travels through the machine is indicated by "sheet line" 183. As can be seen, hub 180 includes an angle portion 184 integral with and axially adjacent to a sprocket portion 186. In this embodiment, sprocket portion 186 is located outside of angle portion 184 in the cross-direction of process flow. Hub 180 is rotatably supported by a shaft 188.

Sprocket portion 186 has a plurality of teeth 190 on its periphery that engage chain 112 as it rotates with hub 180. Angle portion 184 serves to push open the clamps of gripper links 126 as they come into contact with the engaging surface 192 of angle portion 184. In particular, as the bottom of the movable portion 148 of a gripper link 126 (formed in this case by support ledges 166 and 168) comes into contact with engaging surface 192, top plate 160 is pushed away from top plate 158 against the closing force of spring 152. Preferably, the spacing between engaging surface 192 and bottom plate 158 defines the maximum amount that the clamps can open. As the support ledges 166 and 168 are rotated off of engaging surface 192, the clamps will close due to the force of spring 152.

Referring now also to FIG. 12, the engaging surface 192 of angle portion 184 has a diameter in presently preferred embodiments that increases continuously from the side proximal to sprocket portion 186 to the side distal from sprocket portion 186 to provide the desired angle. The angled structure of angle portion 184 desirably causes the clamps of gripper links 126 to be more fully open on the side that receives the plastic sheet 12 than would otherwise be the case. This is advantageous to ensure that the plastic sheet goes into each of the clamps when the machine is operating.

In presently preferred embodiments, the angle θ of engaging surface 192 is preferably in a range of 5 to 18 degrees relative to the rotational axis of hub 180, with an angle of 17 degrees on the upstream (idler) end and 10 degrees on the downstream (driven) end being especially preferred in various embodiments. In addition, the diameter D of the engaging surface 192 will preferably be slightly greater for an upstream hub 114 than for a downstream hub 116 (e.g., at least 15% greater). This is believed advantageous to more fully open the grippers while allowing smooth release of the plastic sheet after molding.

Referring now to FIGS. 13 and 14, a preferred embodiment of stop device 118 will be described. As noted above, stop device 118 includes a mechanical stop 120 that is moved in and out of the engaging position by a solenoid 122. In this embodiment, stop 120 is in the form of an elongate plunger having a larger diameter head 194 and a smaller diameter shank 196. A spring 198 is located around a portion of shank 196, as shown. The plunger and spring are received in a corresponding aperture defined in a support block 200. The aperture has a ledge that encircles an intermediate portion of the shank of the plunger. One end of the spring 198 is seated against this ledge and the other end engages the underside of the head 194. The spring thus urges the mechanical stop 120 upward and out of engagement with the sheet line 183.

Support block 200 defines a linkage seat 202 in the form of a groove that extends transversely from the upper end of the aperture in which the plunger and spring are located. An elongate linkage 204 is positioned in this seat so that one end of the linkage 204 engages the head 194 of the mechanical stop 120. The other end of linkage 204 is connected to solenoid 122. (Linkage 204 is shown separated from linkage seat 202 and solenoid 122 in FIGS. 13 and 14 solely for ease of explanation.) Linkage 204 includes an axle 206 that is transverse to the longitudinal direction of linkage 204 about which it pivots when solenoid 122 moves up or down.

Stop device 118 is activated by actuation of solenoid 122 in an upward direction. Linkage 204 thus pivots in a manner that causes the plunger of mechanical stop 120 to move downward against the force of spring 198. Shank 196 thus prevents plastic sheet 12 from being fed into the machine beyond a location where the clamps are open. As a result, the end of the plastic sheet 12 will not ride over a closed gripper link. When web transport is initiated, solenoid 122 moves downward, which causes shank 196 to retract.

Referring now to FIG. 15, an alternative embodiment of a stop device in accordance with an embodiment of the present invention is illustrated. In this case, the stop device 218 comprises a fluid-actuated (e.g., pneumatically-actuated) cylinder 220 disposed above a location where the plastic sheet 12 is fed into the machine (i.e., above surface 222). For example, cylinder 220 may be disposed on a cantilevered mounting bracket 224 as shown. Cylinder 220 includes connections 226 and 228 for suitable fluid hoses (not shown). The connections provide fluid communication to regions on sides of an internal piston. A rod 230 extends from the piston for reciprocating movement. In this embodiment, mounting bracket 224 defines an aperture through which rod 230 extends. Activation of cylinder 220 thus causes rod 230 to move between a lowered blocking location that stops the advance of plastic sheet 12 and a raised retracted position that allows plastic sheet 12 to advance.

FIG. 16 illustrates a sheet guide protector assembly 240 that may be used in embodiments of the present invention. Assembly 240, which is preferably located along the longitudinal extent of guides 104, is intended to prevent the sheet material from coming out of the infeed system. In particular, the sheet material may have a tendency to bulge in the center when the material is very wide (i.e., near the equipment extremes) and has a relatively long index. In these circumstances, the material may be unwieldy, thus "whipping" the sheet material out of the infeed system. Accordingly, sheet guide protector assembly 240 is provided to reduce such bulging of the sheet material.

As shown, sheet guide protector assembly 240 includes a sheet engaging element 242 located above the sheet material. In particular, sheet engaging element 242 is positioned so that it will not normally contact the sheet material as it is being fed into gripper chain section 108 (in the direction of arrow A). For example, sheet engaging element 242 may comprise one or more rotatable rollers 244 that are nominally spaced at least 0.25 inches from the upper surface of the sheet material. If the sheet material bulges up, however, it will at least briefly contact the surface of roller 244. This prevents further bulging which could tend to pull sheet material from guides 104. A suitable support structure is provided to carry sheet engaging element 242, such as a cross member 246.

In an especially preferred embodiment, roller 244 may comprise a smooth surface roller (e.g., a 4-inch diameter roller) having a stationary axle about which it rotates. Roller 244 preferably has an elastomeric (e.g., rubber) outer surface of soft durometer (e.g., 35 or less). The smooth outer surface and soft durometer provide a low coefficient of friction. This lowers the total friction so as to reduce scuffing, scratching, or marring of the sheet material.

In this case, cross member 246 serves as a rail for a carriage 248 respectively associated with one or both of the guides 104. Specifically, the guides 104 have respective guide plates 250a-b that are parallel to and opposed with each other. A carriage 248 slidably connected to cross member 246 is associated with at least one of these guide plates 250a-b so that sliding movement of the carriage causes the width between the guide plates 250a-b to vary. In this way, different widths of plastic sheet 12 can be accommodated.

Referring now to FIG. 17, a brake mechanism 252 may be associated with each carriage 248 to maintain the desired spacing between guide plates 250a-b. Brake mechanism 252 may take the form of any suitable locking arrangement, including a spring-actuated pin which aligns with corresponding holes in cross member 246 or a thumb screw that tightens against a surface of cross member 246. In the illustrated embodiment, however, a fluid-actuated braking mechanism is utilized in which calipers engage a portion of the cross member 246 when fluid pressure (e.g., pneumatic pressure) is applied. The fluid pressure may be applied via a suitable feed hose 254.

Referring again to FIG. 16, an infeed engaging assembly 256 may also be provided. In this case, assembly 256 comprises one or more sheet engaging elements (e.g., roller 258) positioned just upstream of an infeed surface 260 of the infeed section 102. Roller(s) 258 may be carried, for example, at the distal end of a corresponding arm structure 262. In this case, the proximal end of arm structure 262 is connected to a beam 264 which extends transverse to the process flow path. Beam 264 may have a circular cross section, thus allowing angular adjustment of arm structure 262 as necessary or desired (e.g., by loosening a set screw at the proximal end of arm structure 262). In addition, arm structure 262 may be pivoted completely away from the surface of the engaging position when not in use.

Roller 258 may be similar in construction to roller 244. But, unlike roller 244, roller 258 is intended to nominally engage plastic sheet 12 as it is fed into the machine. In particular, the lower tangent of roller 258 is preferably aligned during use with the height of the infeed surface 260. As a result, any tendency of the plastic sheet 12 to "bow up" (have a convex shape) will be counteracted. While a single roller 258 is shown in FIG. 16, additional sheet engaging elements (e.g., rollers) may be provided in parallel with one another across the infeed width.

It can thus be seen that the present invention provides a novel web transport assembly particularly useful in thermoforming machines. Thus, while one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A thermoforming machine comprising:
a heating oven, a forming station, and a trimming station through which plastic sheet material travels in order to produce molded packages; and
a web transport assembly operative to move the plastic sheet material through at least the forming station, said web transport assembly including:
first and second gripper chains spaced apart from one another and each extending around a closed travel path, each of said gripper chains having a plurality of gripper links and a separate plurality of saddle links, the gripper links and the saddle links being connected together along the length of a respective gripper chain;
first and second parallel rail structures respectively aligned with the first and second gripper chains;
upstream and downstream hubs associated with each of the first and second gripper chains defining a continuous loop about which the associated gripper chain extends;
each of the saddle links having a pair of spaced apart extension portions defining a space in which an associated one of the parallel rail structures is received, the extension portions extending towards an inside of the closed travel path of the gripper chain by a distance greater than side plates of the gripper links; and
each of the gripper links having a gripper mechanism that is configured to clamp a side of the plastic sheet material.

2. A thermoforming machine as set forth in claim 1, wherein the first and second gripper chains comprise only saddle links and gripper links.

3. A thermoforming machine as set forth in claim 2, wherein the gripper links and the saddle links are alternated in each of the first and second gripper chains such that every two of the gripper links are interconnected with each other by one of the saddle links.

4. A thermoforming machine as set forth in claim 1, wherein the gripper mechanism of each of the gripper links is spring-loaded to clamp the side of the plastic sheet.

5. A thermoforming machine as set forth in claim 4, wherein the at least one of the hubs comprises an angled portion beside a sprocket portion, the angled portion defining an engaging surface which causes opening of the gripper mechanism.

6. A thermoforming machine as set forth in claim 5, wherein both the upstream hub and the downstream hub comprise an angled portion beside a sprocket portion.

7. A thermoforming machine as set forth in claim 1, further comprising a sheet guide protector including a sheet engaging element that is nominally spaced from an upper surface of the plastic sheet material.

* * * * *